United States Patent
Sreenivas

(10) Patent No.: US 9,438,117 B2
(45) Date of Patent: Sep. 6, 2016

(54) CURRENT BALANCING IN A MULTI-PHASE POWER SUPPLY

(71) Applicant: Venkat Sreenivas, Winchester, MA (US)

(72) Inventor: Venkat Sreenivas, Winchester, MA (US)

(73) Assignee: Infineon Technologies Americas Corp., El Segundo, CA (US)

( * ) Notice: Subject to any disclaimer, the term of this patent is extended or adjusted under 35 U.S.C. 154(b) by 140 days.

(21) Appl. No.: 14/010,750

(22) Filed: Aug. 27, 2013

(65) Prior Publication Data

US 2014/0253063 A1     Sep. 11, 2014

Related U.S. Application Data

(60) Provisional application No. 61/773,381, filed on Mar. 6, 2013.

(51) Int. Cl.
  *H02M 3/158* (2006.01)
  *H02M 1/08* (2006.01)
  *H02M 3/156* (2006.01)

(52) U.S. Cl.
  CPC ............ *H02M 3/1584* (2013.01); *H02M 1/08* (2013.01); *H02M 3/156* (2013.01); *H02M 2003/1566* (2013.01)

(58) Field of Classification Search
  CPC ...... H02M 3/158; H02M 3/153; H02M 1/08; H02M 2003/1566
  USPC ................. 323/222, 271, 272, 282–285, 299
  See application file for complete search history.

(56) References Cited

U.S. PATENT DOCUMENTS

| | | | | |
|---|---|---|---|---|
| 7,777,461 B2 * | 8/2010 | Martin | ................ | H02M 3/1584 323/272 |
| 8,085,015 B2 * | 12/2011 | Lee | ..................... | H02M 3/1584 323/213 |
| 8,344,712 B2 * | 1/2013 | Martin | .................. | H02M 3/157 323/222 |
| 2002/0125869 A1 * | 9/2002 | Groom | ................ | H02M 3/1584 323/283 |
| 2009/0327786 A1 * | 12/2009 | Carroll | ...................... | G06F 1/26 713/340 |
| 2010/0033153 A1 * | 2/2010 | Xing | ...................... | H02M 3/156 323/288 |
| 2012/0153919 A1 * | 6/2012 | Garbossa | ............... | H02M 3/156 323/284 |
| 2015/0288285 A1 * | 10/2015 | Paul | .................... | H02M 3/1584 323/271 |

OTHER PUBLICATIONS

Search report from STIC EIC 2800 searcher Patel Samir dated Mar. 31, 2016.*
Search report from STIC EIC 2800 searcher Benjamin Martin dated Apr. 1, 2016.*

* cited by examiner

*Primary Examiner* — Timothy J Dole
*Assistant Examiner* — Htet Z Kyaw
(74) *Attorney, Agent, or Firm* — Chapin IP Law, LLC

(57) ABSTRACT

According to example configurations herein, a controller is operated in a control mode (such as a high-speed control mode) in which the controller controls multiple phases in the power supply to produce an output voltage. The output voltage produced by the controller supplies current to power a dynamic load. While in the (high-speed current balance) control mode, the controller: i) produces, for each of the multiple phases, a respective current value representative of an estimated amount of current supplied by that phase to the dynamic load; and ii) modifies an order of activating the phases based on magnitudes of respective estimated current values produced for the multiple phases.

24 Claims, 9 Drawing Sheets

CURRENT BALANCING IN A MULTI-PHASE POWER SUPPLY

RELATED APPLICATIONS

This application is related to and claims the benefit of earlier filed U.S. Provisional Patent Application Ser. No. 61/773,381 entitled "Power Supply Circuitry and Control," filed on Mar. 6, 2013, the entire teachings of which are incorporated herein by this reference.

BACKGROUND

Conventional multi-phase voltage regulators typically control activation of multiple phases to produce an output voltage to power a respective load. The amount of current consumed by the load can vary over time. For example, a load such as a processor dynamically can change its current draw to optimize performance and efficiency.

For optimal efficiency, the currents supplied by each of multiple phases typically need to be balanced. In other words, it is typically desirable that the current from each of multiple phases is substantially equal. In accordance with conventional techniques, a low bandwidth, low speed algorithm can be used to physically measure current provided by each phase and ensure current balancing via respective adjustments.

However, during load oscillations (such as when there are sudden changes in load current), it is possible that one or two phases conduct more current at the expense of others because it is often very difficult to equalize or balance phases during a transient condition. Current imbalance amongst multiple active phases can lead to undesirable consequences, one of which is inductor saturation (a fall in inductor impedance), which leads to current spikes. The current spikes can cause damage to circuitry.

BRIEF DESCRIPTION

Conventional applications addressing phase current imbalance such as those as discussed above can suffer from a number of deficiencies. For example, physically measuring current and making appropriate adjustments may work properly during steady state or non-transient conditions when a load draws substantially a same amount of current over time. However, during transient conditions when a load consumes substantially different amounts of current in short periods of time, it is difficult to physically measure the phases and properly control them to be balanced.

There are a number of ways to address phase current imbalance. For example, one way to address phase current imbalance is to design a respective voltage regulator to include more phases. Respective inductors can be designed to withstand larger saturation currents. This, of course, increases the cost of fabricating a respective multi-phase power supply.

Another way to address phase current imbalance is to use a high-speed analog to digital circuit to physically monitor all the inductor currents in real time and then limit the current to below the saturation limit using an algorithm. This solution is typically expensive because a high-speed analog to digital circuitry uses a lot of power and requires a large area in the voltage regulator circuit.

In contrast to conventional techniques, embodiments herein include an algorithm configured to deduce or synthesize the phase currents without the use of a high-speed analog to digital circuit to physically measure current. The algorithm can be configured to initiate phase control based on estimated current values to keep the inductor currents (in each phase) balanced with respect to each other. Embodiments herein alleviate the need for complex circuitry, saving on manufacturing costs and/or valuable circuit board real estate (space).

Accordingly, embodiments herein include one or more novel ways of balancing phase current in a multi-phase switching power supply. Phase current balancing as discussed herein can provide increased stability and improved transient performance for different types of operating conditions.

More specifically, one embodiment herein includes a controller. The controller is operated in a control mode (such as a high-speed control mode) in which the controller controls multiple phases in the power supply to produce an output voltage. The output voltage produced by the controller supplies current to power a dynamic load. While in the (high-speed current balancing) control mode, the controller: i) produces, for each of the multiple phases, a respective current value representative of an estimated amount of current supplied by that phase to the dynamic load; and ii) modifies an order of activating the phases based on magnitudes of respective current values (representing estimated current) produced for the multiple phases. In one embodiment, the estimated current for each phase is continuously calculated. By way of a non-limiting example, the estimated current for each phase may be used only during high speed current balancing control mode.

In one embodiment, the estimated amount of current for each phase can be calculated based at least in part on the actual pulse width modulation signals used to drive switches in the different phases.

Example embodiments can be implemented along with any of one or more of the following features to produce yet further embodiments below:

In one embodiment, the technique of modifying the order of activating the phases substantially balances the magnitudes of respective currents supplied by the multiple phases over time.

In accordance with another embodiment, the controller compares the magnitudes of the respective estimated current values with respect to each other. Based on results of the comparison, the controller identifies a particular phase amongst the multiple phases that currently supplies a lesser or least amount of current to the dynamic load. The controller initiates activation of the particular phase as being next in a sequence of activating the multiple phases.

In yet another embodiment, the controller monitors a magnitude of an input voltage used by the multiple phases to produce the output voltage that produces the current powering the dynamic load. The controller also monitors a magnitude of the output voltage. The controller utilizes the magnitude of the input voltage and the magnitude of the output voltage at least in part as a basis to produce the respective estimated current value for each of the multiple phases.

In still further embodiments, in a high-speed control mode during a respective transient current consumption condition, the controller monitors a magnitude of an input voltage used by the multiple phases to produce the output voltage that produces the current powering the dynamic load. The controller also monitors a magnitude of the output voltage of the power supply. The controller receives pulse width modulation control setting information (e.g., pulse width modulation adjustment values, actual pulse width modulation drive signals, etc.) associated with the control of the multiple phases. In one embodiment, the pulse width modulation control setting information can be obtained via monitoring the physical output of signals from switch driver circuits used to control respective switches in each of the phases. The controller applies the pulse width modulation control setting information to the magnitude of the input voltage and the magnitude of the output voltage to produce respective estimated current value for each of the multiple phases.

In one embodiment, a portion of the control circuit produces a pulse width modulation adjustment value for each of the phases to modify the pulse width modulation values from respective base pulse width modulation values to balance current outputted amongst the phases. The pulse width modulation adjustments are made to account for variations amongst the phases. This works for low speed, or steady state phase current balancing.

When generating the estimated currents in each of the phases using a respective synthesizer (such as a digital signal processor), the pulse width modulation adjustment values (used in low speed phase current balance) can be used to produce a more accurate reflection of current in each of the phases. For example, the synthesizer can be configured to produce the estimated current values for the phases based on the assumption that the phases are ideal circuits. The synthesizer can be configured to receive pulse width modulation adjustment information applied to each of the phases to account for variations in the actual phase circuits when producing the synthesized current values representative of the actual currents. Details are discussed below.

In yet further embodiments, while operating the controller in a low speed (first) control mode, the controller monitors AC (Alternating Current) attributes of the output voltage. In response to detecting degradation of the AC attributes of the output voltage beyond a threshold value while in the first control mode, the controller switches to operation of the controller to the high-speed control mode. Any of one or more suitable attributes (such as magnitude, frequency, etc.) of the AC component can be monitored to determine whether and when to switch between operational modes.

In the high-speed control mode, the controller can be configured to: i) produce for each of the multiple phases, a respective estimated value representing an actual amount of current supplied by that phase to the dynamic load, and ii) adjust pulse width modulation control settings of the phases based on magnitudes of the respective estimated actual current values produced for the multiple phases to provide phase current balance. The controller adjusts an activation order of the phases in the high-speed mode. In contrast, in the low-speed control mode, the controller can be configured to activate the phases in accordance with a predetermined activation order. In low-speed control mode, the controller adjusts the pulse width modulation of the phases to balance the amount of current supplied by the phases.

In one embodiment, the control operation of adjusting the pulse width modulation control settings based on magnitudes of the respective actual current values includes: balancing current supplied by the multiple phases to be within a range of each other. Thus, the current supplied by each of multiple phases can be approximately equal.

In yet another embodiment, the respective current value (such as a synthesized value) generated for each of the multiple phases represents an estimated amount of AC current supplied by that phase to the dynamic load.

By further way of a non-limiting example, the controller can be configured to operate in the high-speed control mode (in which the controller controls an activation order of phases) in response to detecting a transient change in consumption of the current by the dynamic load above a threshold value. As an example, the controller can be configured to control the output voltage to be substantially around a target DC value. The controller can be configured to operate the controller in the high-speed control mode in response to detecting that a magnitude of an AC voltage component of the output voltage is above a threshold value. Additional embodiments can include monitoring a frequency of ripple or AC component in the output voltage and comparing it to a respective threshold value. The decision of whether to operate in the high-speed control mode can be based at least in part on whether the frequency of the AC component on the output voltage is above a respective threshold value. Thus, frequency and/or magnitude of the AC component can be monitors to determine whether or not to switchover to the high-speed or transient control mode.

In yet further embodiments, the controller can be configured to detect, amongst the multiple phases, a currently activated phase in which a corresponding control switch is in an ON state. Assume that the currently activated phase provides the least amount of estimated current to the dynamic load amongst the multiple phases. In such an instance, the control selects, amongst the multiple phases, a non-activated phase providing a next least amount of estimated current to the dynamic load. The selected phase has a corresponding control switch that is not in the ON state. The controller sets the corresponding control switch in the selected phase to an ON state to activate the selected phase.

In one embodiment, the corresponding control switch in the currently activated phase is set to the ON state at the same time that the corresponding control switch in the selected phase is set to the ON state. The corresponding control switch in the currently activated phase can be set to the OFF state based on a predetermined calculation by the controller.

Yet further embodiments include operating multiple control loops to implement phase current balancing during different types of power supply operating conditions. For example, a low bandwidth control loop (such as a first control loop) can be implemented to ensure the right amount of current in each phase (balanced or imbalanced for thermal reasons) during non-transient conditions (minor load oscillations). In addition, implementation of a high-speed control loop (such as a second control loop) during transient conditions ensures that phase currents are balanced during more severe load oscillations.

In one embodiment, high-speed phase balance can include adjusting a pulse ordering (or pulse position relative to the other phases). The current level in a phase that is carrying too much current can be corrected by delaying activation of the phase in the phase sequence. The additional current is automatically taken up by other phases, which are in effect sped up.

In accordance with another embodiment, current in a phase can be inferred digitally by observing its pulse train (phase current synthesis). With the knowledge of Vin (input voltage), Vout (output voltage) and the pulse train information, embodiments herein can include reproducing the phase currents digitally.

Embodiments herein include the observation that since Vin (input voltage), Vout (output voltage) are digital signals, they are prone to small errors. These errors contribute to larger and larger inductor current errors over time, since inductor currents are obtained by integrating voltages. In one embodiment, the synthesized (i.e., estimated) currents are high pass filtered, so that they cannot grow over time in the +ve or −ve directions. Due to the high pass filter, over the long run, a controller can be configured to monitor the substantially AC (Alternating Current) portion of the individual estimated phase currents to determine a respective phase activation order.

Any combination of features as discussed herein can be used to improve a multi-phase voltage regulator's response to phase current imbalances during load oscillations and non-transient load conditions.

These and other more specific embodiments are disclosed in more detail below.

The embodiments as described herein are advantageous over conventional techniques. For example, the embodiments as discussed herein are applicable to switching voltage regulators with a buck topology for application to low voltage processors, memory, digital ASICs, etc. The concepts disclosed herein, however, are applicable to other suitable topologies such as boost regulators, buck-boost regulators, etc.

Note that embodiments herein can include a controller configuration of one or more processor devices to carry out and/or support any or all of the method operations disclosed herein. In other words, one or more computerized devices or processors can be programmed and/or configured to operate as explained herein to carry out different embodiments.

Yet other embodiments herein include software programs to perform the steps and operations summarized above and disclosed in detail below. One such embodiment comprises a computer program product that has a non-transitory computer-storage medium (e.g., memory, disk, flash, . . . ) including computer program logic encoded thereon that, when performed in a computerized device having a processor and corresponding memory, programs the processor to perform the operations disclosed herein. Such arrangements are typically provided as software, code and/or other data (e.g., data structures) arranged or encoded on a computer readable storage medium or non-transitory computer readable media such as an optical medium (e.g., CD-ROM), floppy or hard disk or other a medium such as firmware or microcode in one or more ROM or RAM or PROM chips, an Application Specific Integrated Circuit (ASIC), etc. The software or firmware or other such configurations can be installed onto a controller to cause the controller to perform the techniques explained herein.

Accordingly, one particular embodiment of the present disclosure is directed to a computer program product that includes a computer readable medium having instructions stored thereon for supporting operations such as controlling phases in a power supply. For example, in one embodiment, the instructions, when carried out by computer processor hardware, cause the computer processor hardware to: operate a controller in a control mode in which the controller controls multiple phases in a power supply to produce an output voltage, the output voltage supplying current to power a dynamic load; while in the control mode: for each of the multiple phases, produce a respective current value representative of an estimated amount of current supplied by that phase to the dynamic load; and modify an order of activating the phases based on magnitudes of respective current values produced for the multiple phases.

The ordering of the steps has been added for clarity sake. These steps can be performed in any suitable order.

By way of a non-limiting example, the concepts as discussed herein can be applied to switching voltage regulators with a buck topology for application to low voltage processors, memory, digital ASICs, etc. The concept however is applicable to other topologies such as boost and buck-boost regulators.

It is to be understood that the system, method, apparatus, etc., as discussed herein can be embodied strictly as hardware, as a hybrid of software and hardware, or as software alone such as within a processor, or within an operating system or a within a software application. Example embodiments of the invention may be implemented within products and/or software applications such as those developed or manufactured by International Rectifier Corporation of El Segundo, Calif., USA.

Additionally, note that although each of the different features, techniques, configurations, etc., herein may be discussed in different places of this disclosure, it is intended, where appropriate, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Figure 1:
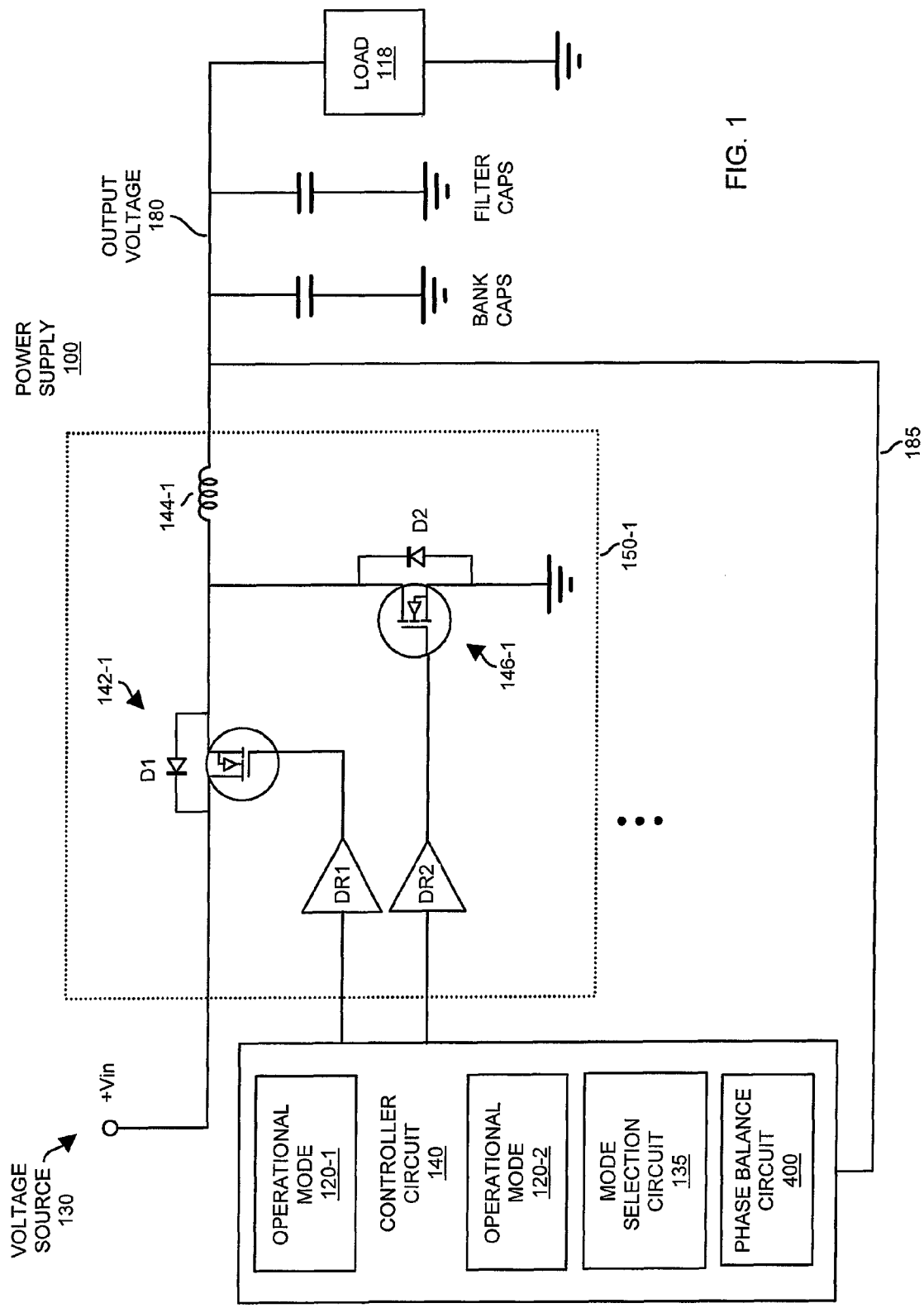
FIG. 1 is an example diagram of a power supply configured to operate in multiple control modes according to embodiments herein.

FIG. 1 is an example diagram of a power supply 100 according to embodiments herein. As shown, the power supply 100 includes controller circuit 140 (i.e., control circuitry). Controller circuit 140 controls operation of multiple phases 150 (such as phase 150-1, phase 150-2, phase 150-3, etc.) in power supply 100.

Figure 2:
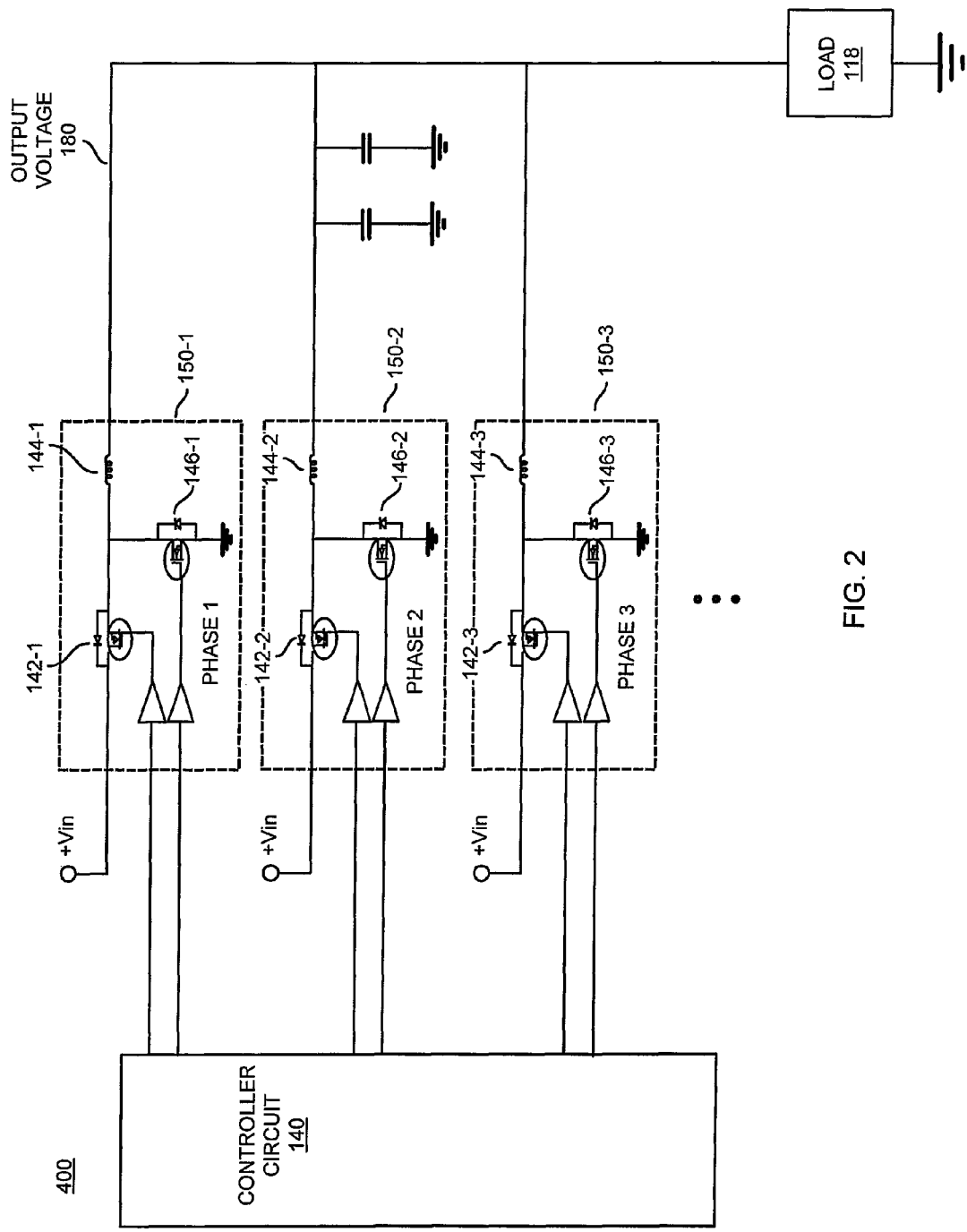
FIG. 2 is an example diagram of a multi-phase power supply according to embodiments herein.

As shown in FIG. 2, the power supply 100 can be configured to any number of phases including phase 150-1, phase 150-2, phase 150-3, etc. When activated each phase supplies a corresponding amount of current to power dynamic load 118. Collectively, the sum of currents supplied by the phases power the dynamic load 118. The number of activated phases can vary over time depending on current consumption by dynamic load 118.

As shown, phase 150-1 includes high side switch circuitry 142-1, low side switch circuitry 146-1, and inductor 144-1; phase 150-2 includes high side switch circuitry 142-2, low side switch circuitry 146-2, and inductor 144-2; phase 150-3 includes high side switch circuitry 142-3, low side switch circuitry 146-3, and inductor 144-3; and so on.

Referring again to FIG. 1, controller 140 controls phases 150 to produce output voltage 180 within a desired DC (Direct Current) voltage range. For example, an operator of the power supply 100 can configure the power supply 100 to produce the output voltage 180 to be a value such as 1.0 volt DC. In such an instance, the controller circuit 140 controls the phases 150 to produce the output voltage 180 to be within a tolerable range around 1.0 volts DC.

Note that the value 1.0 VDC is shown by way of non-limiting example only and that an operator of power supply 100 can specify any suitable DC voltage in which to produce output voltage 180.

Feedback 185 can include any suitable information or signals such as output voltage 180, actual current supplied by each of the phases 150, etc.

The controller circuit 140 produces control signals to control a state of drivers (such as DR1 and DR2) in each phase. The drivers control operation of respective high side switch circuitry 142 and low side switch circuitry 146. The high side switch circuitry 142 and low side switch circuitry 146 each can include one or more switches such as MOSFET (Metal Oxide Semiconductor Field Effect Transistor) devices.

When high side switch circuitry 142 is activated or turned ON (while low side switch circuitry 146 is OFF), the high side switch circuitry 142 creates a highly conductive path from voltage source 130 (i.e., input voltage Vin) to the inductor 144. In this instance, the current through inductor 144 thus increases. Thus, a respective phase is activated when the respective high side switch circuitry is turned to an ON state.

When low side switch circuitry 146 is activated or turned ON (while high side switch circuitry 142 is deactivated or turned OFF), the low side switch circuitry 146 creates a conductive path from the respective node of inductor 144 to ground. In this instance, the current through inductor 144 thus decreases. Thus, a respective phase is deactivated when the respective high side switch circuitry is turned to an OFF state.

To disable a phase, the phase control logic 240 can be configured to set both high side switch circuitry 142 and low side switch circuitry 146 to an OFF state such that the phase 150-1 is disabled and no longer provides current to dynamic load 118.

The controller circuit 140 activates respective high side switches (control switches) and respective low side switches (synchronization switches) in each phase such as phase 150-2, phase 150-3, etc., to produce output voltage preview window generator dynamic load 118. The activation of high side switches in the phases can be staggered or delayed with respect to each other to produce output voltage 180 with lower ripple.

Via the generation of output voltage 180, the combination of active phases supplies respective power to dynamic load 118.

As its name suggests, the current consumption by dynamic load 118 may be the same or vary over time. By way of a non-limiting example, the dynamic load 118 may consume 2 amperes of current in a first time window and 100 amperes in subsequent millisecond time window. Thus, a change in current consumption can be drastic. At other times, the dynamic load 118 may consume a reasonably fixed amount of current such as 5 amperes for several seconds.

Controller circuit 140 operates the power supply 100 in different operational modes depending on operating conditions. For example, during steady state conditions when the dynamic load 118 consumes a relatively constant amount of current, the controller circuit 140 operates in accordance with operational mode 120-1. During oscillatory conditions in which the consumption of current by dynamic load 118 varies greatly over a short amount of time, the controller circuit 140 operates in accordance with the operational mode 120-2.

One embodiment herein includes balancing an amount of current supplied by each of the phases to the dynamic load 118 so that they are approximately the same for each of the different operational modes 120 (operational mode 120-1 and operational mode 120-2).

In general, during steady state type conditions and selection of operational mode 120-1, the controller circuit 140 receives feedback indicating actual current consumed by each of the phases 150 and, based on such information, varies pulse widths of the activated phases 150 to approximately equalize (e.g., balance) the amount of current supplied to the dynamic load 118 by each of the phases 150. In other words, during the operational mode 120-1, the controller circuit 140 controls the phases based on actual current provided by the phases 150 to the dynamic load 118.

In contrast, during oscillatory conditions when the amount of current consumed by the dynamic load 118 varies greatly, the mode selection circuit 135 selects operational mode 120-2. In such an instance, the controller circuit 140 estimates the amount of current provided by each of the phases 150 and, based on such information, modifies an activation order of the phases to approximately equalize (e.g., balance) the amount of current supplied to the dynamic load 118 by each of the phases 150. The operational mode 120-1 may not be sufficiently responsive to accurately detect fast changing current conditions. In such an instance, the estimated current (instead of actual current) in operational mode 120-2 is used to equalize current among the phases 150.

In one non-limiting example embodiment, while in the operational mode 120-2, and to approximately equalize phase currents, the controller circuit 140 produces, for each of the multiple phases 150, a respective current value representative of an estimated amount of current supplied by that phase to the dynamic load 118. The controller circuit 140 modifies an order of activating the phases 150 based on magnitudes of respective (estimated) current values produced for the multiple phases 150.

In one embodiment, the controller circuit 140 includes mode selection circuit 135 to monitor operating conditions of the power supply 100 and select which of the multiple modes to operate. The mode selection circuit 135 operates as discussed below.

Figure 3:
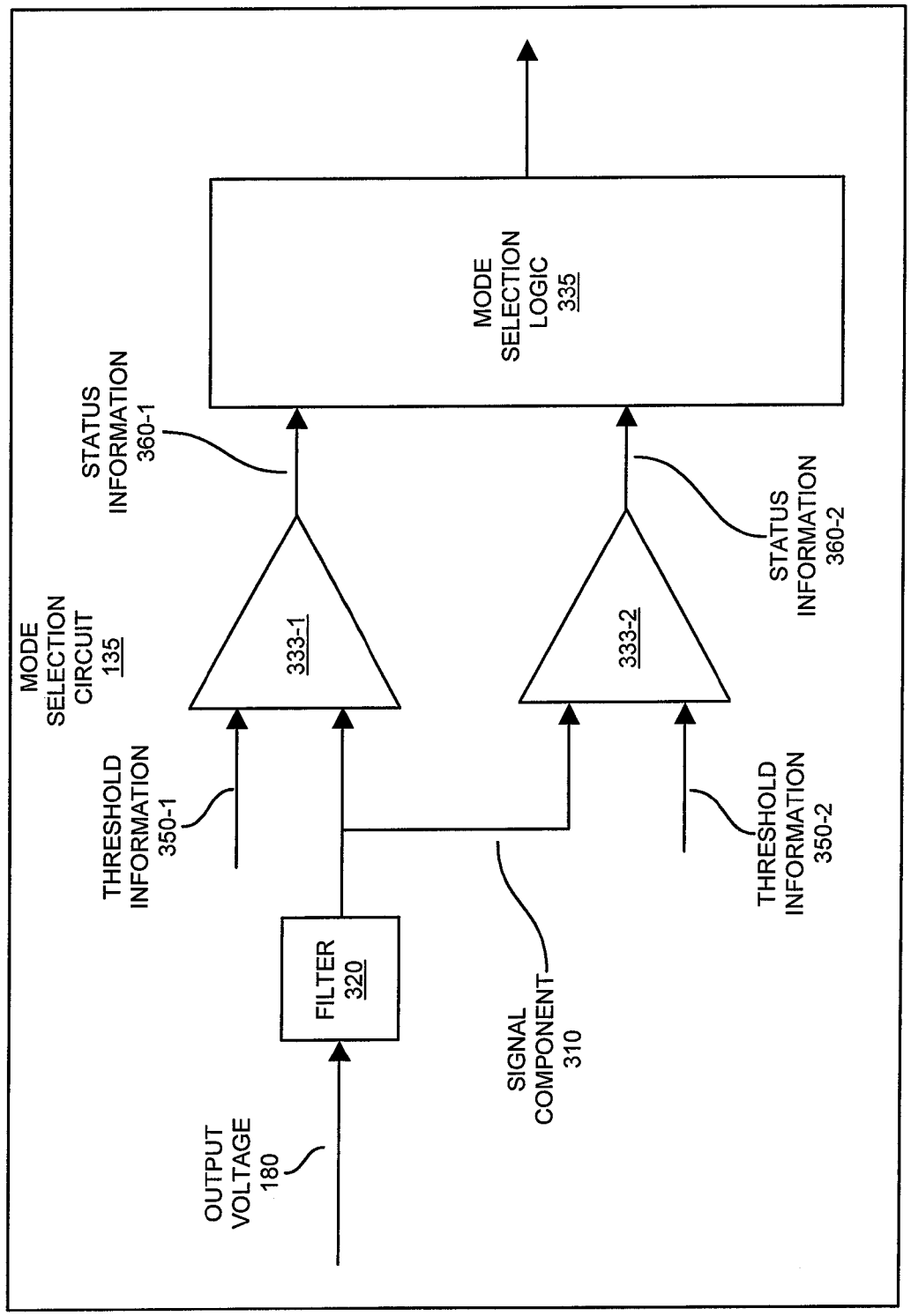
FIG. 3 is an example diagram illustrating of a mode selection circuit according to embodiments herein.

FIG. 3 is an example diagram illustrating a mode selection circuit according to embodiments herein.

By way of a non-limiting example, mode selection circuit 135 can be configured to differentiate between oscillatory (transient current consumption conditions) and non-oscillatory operating conditions (non-transient current consumption conditions). For example, mode selection circuit 135 can include filter 320 (such as a high pass filter). The output voltage 180 can include both a DC component (such as 1.0 volts DC) and AC component (such as ripple). Filter 320 (such as a high pass filter) passes signal component 310 such as the AC component of output voltage 180 to comparator resource 333-1 and comparator resource 333-2.

In one embodiment, the comparator resource 333-1 performs a frequency analysis. For example, threshold information 350-1 can specify a desired threshold frequency value. An operator of power supply 100 can set the threshold information 350-1 in any suitable manner. For example, an external resistor can be installed on a respective circuit board to indicate a desired threshold value; an operator of power supply 100 can initiate storage of a digital value in a storage resource accessible to the controller circuit 140, etc.

The comparator resource 333-1 compares a frequency of signal component 310 (such as the AC component of output voltage 180) with the threshold information 350-1. Based on the comparison, the comparator resource 333-1 produces status information 360-1 indicating whether the frequency of the signal 310 is greater than or less than the frequency threshold value as specified by the threshold information 350-1. Mode selection logic 335 receives the status information 360-1 from comparator resource 333-1.

In one embodiment, the comparator resource 333-2 performs a voltage amplitude analysis. For example, threshold information 350-2 can specify a desired voltage threshold value. An operator of power supply 100 can set the threshold information 350-2 in any suitable manner. For example, an external resistor can be installed on a respective circuit board to indicate a desired threshold value; an operator of power supply 100 can initiate storage of a digital value in a storage resource accessible to the controller circuit 140, etc.

The comparator resource 333-2 compares the amplitude of signal component 310 (such as the AC component of output voltage 180) with the threshold information 350-2. Based on the comparison, the comparator resource 333-2 produces status information 360-2 indicating whether the amplitude of the signal 310 is greater than or less than the amplitude as specified by the threshold information 350-2. Mode selection logic 335 receives the status information 360-2 from comparator resource 333-2.

Mode selection logic 335 monitors the status information 360-1 and status information 360-2 to determine a health of the output voltage 180 and determine which operational mode to select. During conditions such as when the frequency of the signal 310 is above a frequency threshold value and the amplitude of signal is above a voltage threshold value, the mode selection logic 335 (in mode selection circuit 135) selects to operate the controller circuit 140 in the operational mode 120-2.

During conditions such as when the frequency of the signal 310 is below a frequency threshold value and the amplitude of signal is below a voltage threshold value, the mode selection logic 335 can be configured to select to operate the controller circuit 140 in the operational mode 120-1.

The mode selection circuit 135 can be configured to switch between operating in the different operational modes 120 in response to detecting degradation of the signal 310. For example, while operating the controller circuit in a control mode 120-1, the mode selection circuit 135 can be configured to monitor AC (Alternating Current) attributes of the output voltage 180. In response to detecting degradation of the AC attributes of signal 310 beyond a threshold value while in the first control mode 120-1, the controller circuit mode selection circuit 135 initiates switching to operation of the controller circuit 140 in the operational mode 120-2.

As mentioned, operating in the operational mode 120-1 (prior to switchover) can include: for each of the multiple phases 150, producing and/or receiving a respective actual current value representative of an actual amount of current supplied by that phase to the dynamic load 118 and adjusting pulse width modulation control settings of the phases 150 based on magnitudes of the respective actual current values produced for the multiple phases. Adjusting the pulse width modulation control settings based on magnitudes of the respective actual current values can include: balancing current supplied by the multiple phases 150 to be within a range of each other. Accordingly, the first mode 120-1 can include a first way of equalizing or balancing phase currents.

Accordingly, embodiments herein can include, via controller circuit 140, controlling the output voltage 180 to be a target DC value. The controller circuit 140 can be configured to switchover to operation of the operational mode 120-2 in response to detecting that a magnitude and/or frequency of signal 310 (an AC voltage component of output voltage 180) is above one or more respective threshold values. Either or both of attributes (such as frequency and amplitude) can trigger the controller circuit 140 to switch from one mode to another.

Note that detection of oscillatory or transient conditions (as characterized by conditions such as large current consumption swings and/or large ripple voltages in output voltage 180) or steady state conditions (as characterized by conditions such as small current consumption swings and/or small ripple voltages in output voltage 180) can be performed in any suitable manner.

In one embodiment, as mentioned, the mode selection circuit 135 initiates operating the controller circuit 140 in the operational mode 120-2 in response to detecting a transient change in consumption of the current by the dynamic load 118 above a threshold value. As discussed herein, operating in the operational mode 120-2 during oscillatory conditions results in a lower AC ripple voltage on the output voltage 180. Accordingly, the controller circuit 140 is able to produce the output voltage 180 within a desired range to power dynamic load 118.

Figure 4:
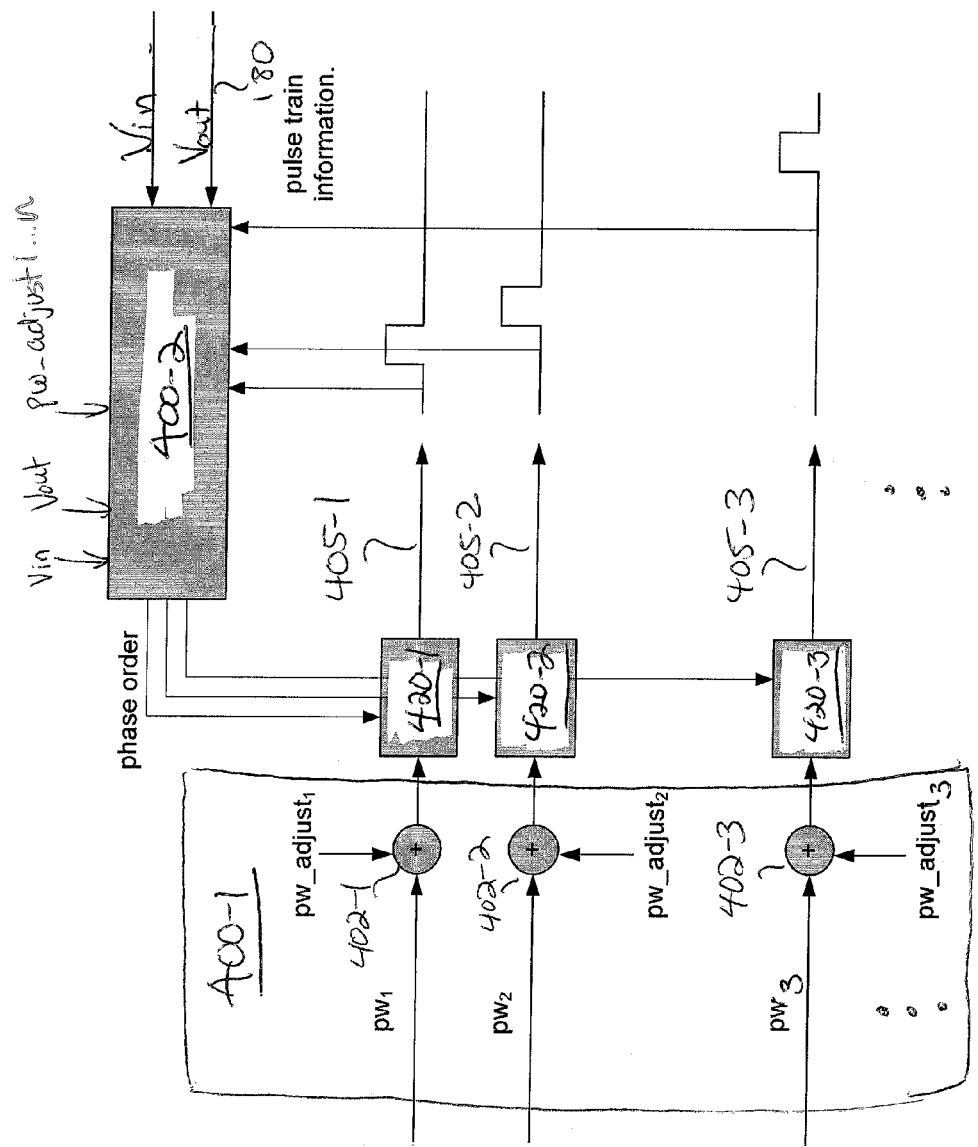
FIG. 4 is an example diagram illustrating a transient control mode and a steady state control mode according to embodiments herein.

FIG. 4 is an example diagram illustrating a transient control mode and a steady state control mode according to embodiments herein.

In this example embodiment, phase balance circuit 400-1 includes summer circuit 402-1, summer circuit 402-2, summer circuit 402-3, etc.

While in operational mode 120-1, the controller circuit 140 adjusts the pulse width of each phase by a pulse width adjust value that is unique to each phase. For example, controller circuit 140 generates control signal pw1 to control switches in phases 150-1; controller circuit 140 generates control signal pw2 to control switches in phases 150-2; controller circuit 140 generates control signal pw3 to control switches in phases 150-3; and so on. The values pw1, pw2, pw3, etc., may vary to account for noise, transients, etc.

In general, a logic high in a respective control signal indicates to turn a high side switch circuit in the corresponding phase to an ON state and set the low side switch circuitry to an OFF state; a logic low in a respective control signal 405 indicates to turn a high side switch circuit in the corresponding phase to an OFF state and set the low side switch circuitry to an ON state.

In one embodiment, in operational mode 120-1, the pulse width adjustment values pw_adjust1, pw_adjust2, pw_adjust3, are determined using a highly filtered (such as low pass) value of the individual phase currents. This is the slow phase balance loop that ensures that the currents are balanced in the long term.

Via a respective summer circuit:

Actual_$pw_i = pw_i + pw\_adjust_i$, where pw_adjusti is a function of highly filtered phase currents Control signal generator 420-1 receives the output (e.g., pw1+pw_adjust1) of summer circuit 402-1 and produces a respective control signal 405-1 to control switches in phase 150-1; control signal generator 420-2 receives the output (e.g., pw2+pw_adjust2) of summer circuit 402-2 and produces a respective control signal 405-2 to control switches in phase 150-2; control signal generator 420-3 receives the output (e.g., pw3+pw_adjust3) of summer circuit 402-3 and produces a respective control signal 405-3 to control switches in phase 150-3; and so on.

As previously discussed, the controller circuit 140 generates adjustment values (such as pw_adjust1, pw_adjust2, pw_adjust3, and so on) to equalize phase current during the operational mode 120-1. The control circuit 140 can be configured to generate pw_ adjust values during both the high speed and low-speed modes.

As mentioned, a logic high in a respective control signal 405 indicates to turn a high side switch circuit (control switch) in the corresponding phase to an ON state and set the low side switch circuitry (synchronous switch) to an OFF state; a logic low in a respective control signal 405 indicates to turn a high side switch circuit in the corresponding phase to an OFF state and set the low side switch circuitry to an ON state.

When set to the operational mode 120-2, the controller circuit 140 utilizes phase balance circuit 400-2 to select a next phase to be activated to supply current to dynamic load 118. As shown, the phase balance circuit 400-2 selects the order of activating phases based at least in part on pw_adjust values, the input voltage Vin, output voltage 180 (Vout), and a state of the control signals generated by control signal generators 420 to control the phases 150. More specific details of the phase balance circuit 400-2 (that selects an activation order) are shown in FIG. 5.

Figure 5:
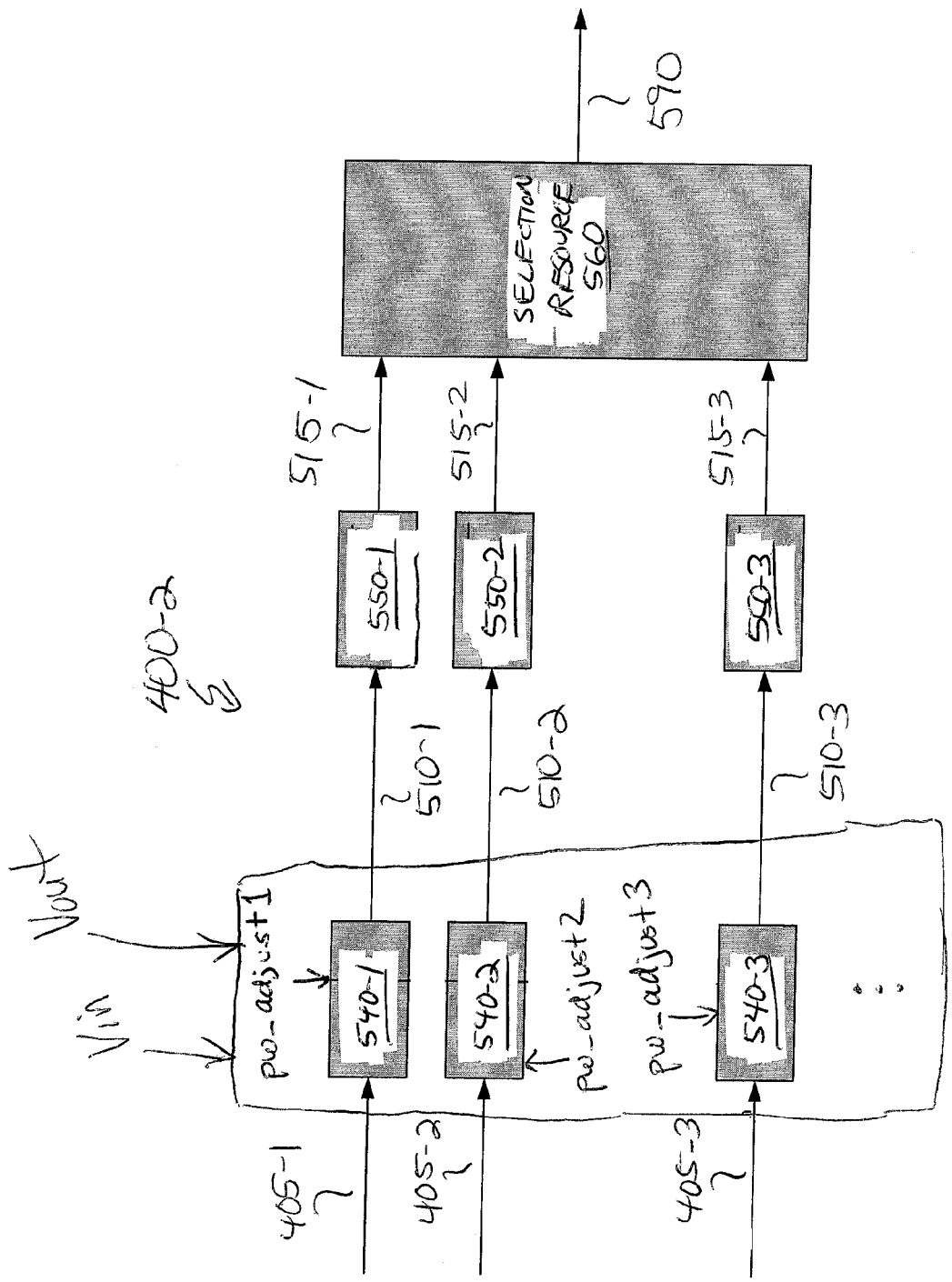
FIG. 5 is an example diagram illustrating details of a transient control mode according to embodiments herein.

FIG. 5 is an example diagram illustrating a transient control mode according to embodiments herein.

In one embodiment, when set to the operational mode 120-2) the phase balance circuit 400-2 produces synthesized phase current values (i.e., estimated values) for each phase using its pulse train information such as control signals 405.

For example, during operational mode 120-2, processing thread 540-1 receives parameters such as pw_adjust1 value, control signal 405-1, Vin, and Vout. When control signal 405-1 is set to logic one (high side switch circuitry ON, low side switch circuitry OFF), the phase current increases by (Vi−Vo*n) for the corresponding duration as indicated by control signal 405-1. When the control signal 405-1 is logic zero (high side switch circuitry OFF, low side switch circuitry ON), the phase current decreases by (Vo*n), where n is the value 1.

In one embodiment, the processing thread 540-1 physically monitors the control signal 405-1 (actual control signal driving respective switches) to determine timing and the estimated current for that phase. For example, the processing thread 540-1 monitors control signal 405-1 to determine when the respective control switch 142-1 is activated.

In one embodiment, when calculating the current for phase 1, the processing thread 540-1 adjusts the actual detected amount of time that the control switch in phase 1 is activated by an amount as specified by the pw_adjust1 value. For example, if pw_adjust1 indicates to increase a pulse by amount x, the processing thread 540-1 reduces the physically detected high side switch time by the amount x and uses the reduced actual time as a basis to produce the synthesized signal 510-1. If pw_adjust2 indicates to decrease a pulse by amount y, the processing thread 540-1 increases the physically detected high side switch time by the amount y and uses the increased actual time as a basis to produce the synthesized signal 510-1 (estimated current).

Thus, the processing thread 540-1 produces the estimated output current of the phase based on the assumption that the corresponding phase is ideal. A more accurate estimation of the current output of each phase can be achieved by adjusting the actual detected high side switch activation time by the corresponding pulse width modulation adjustment value pw_adjust.

If the user uses a driver that multiples the number of phases by a factor (such as 2 by doubling the number of switches and inductors for a phase), n reflects the change. Based on this information, the processing thread 540-1 produces signal 570-1 representing an estimate of current provided by phase 150-1 over time.

In a similar manner, each of the processing threads 540 produces an estimated current for a respective phase. For example, processing thread 540-2 receives pw_adjust2, control signal 405-2 (used to control switches in phase 150-2), Vin, and Vout and produces signal 510-2 representing an estimated amount of current supplied phase 150-2 to the dynamic load 118; processing thread 540-3 receives pw_adjust3, control signal 405-3 (used to control switches in phase 150-3), Vin, and Vout and produces signal 510-3 representing an estimated amount of current supplied phase 150-3 to the dynamic load 118; and so on.

Embodiments herein can include tri-stating the high side switch circuitry and low side switch circuitry. Note that if the control signal pulses are tri-stated:

If it is during diode braking, the phase current decreases by (Vo+VD)*n

If it is due to phase drop or diode emulation, the phase current goes to 0.

where VD=diode voltage drop associated with the inherent diode D2 in respective low side switch circuitry.

Accordingly, during the operational mode 120-2, the phase balance circuit 400-2 monitors a magnitude of an input voltage Vin used by the multiple phases 150 to produce the output voltage 180. The phase balance circuit 400-2 also monitors a magnitude of the output voltage 180 (i.e., Vout). The phase balance circuit 400-2 receives pulse width modulation control setting information (e.g., actual control signals 405 and pw_adjust values indicating how to control switch circuitry in the phases) associated with the control of the multiple phases 150. In a manner as discussed above, the processing threads 540 in phase balance circuit 400-2 apply the pulse width modulation control setting information to the magnitude of the input voltage (Vin) and the magnitude of the output voltage 180 (Vout) to produce the respective current value for each of the multiple phases.

Further embodiments herein include high pass filtering the estimated current (e.g., estimated current signal 510-1, estimated current signal 510-2, . . . ) in each of the phases using filters 550 (such as filter 550-1, filter 550-2, filter 550-3, etc.). For example, filter 550-1 filters signal 510-1 to produce filtered signal 515-1; filter 550-2 filters signal 510-2 to produce filtered signal 515-2; filter 550-3 filters signal 510-3 to produce filtered signal 515-3; and so on.

In one embodiment, the respective current value (such as signals 515) produced for each of the multiple phases 150 represents an estimated amount of AC current supplied by that phase to the dynamic load 118.

While in operational mode 120-2, selection resource 460 in the phase balance circuit 400-2 analyzes the filtered estimated current of each phase as specified by the corresponding signal 515. In one embodiment, the selection resource 560 continuously (every digital clock) calculates the phase that provides the minimum amount of current. Note that unused phases (phases that are shut OFF or disabled) cannot be the minimum phase. As will be discussed in FIG. 8, a phase that has high side switch circuitry set to an ON state cannot be the minimum phase unless all used phases have respective high side switch circuitry set to an ON state.

As further discussed below, in the high-speed operational mode (during transient current consumption) the selection resource 560 of the phase balance circuit 400-2 re-orders activation of phases 150 in the phase sequence so that the next activated phase (high side switch circuitry turned ON) is issued for the phase that has the minimum filtered synthetic current as indicated by signals 515 (i.e., lowest estimated current amongst the phases). In one embodiment, the selection resource 560 produces activation order information 590 to indicate the ordering of phase activation or next phase to activate in the sequence.

Figure 6:
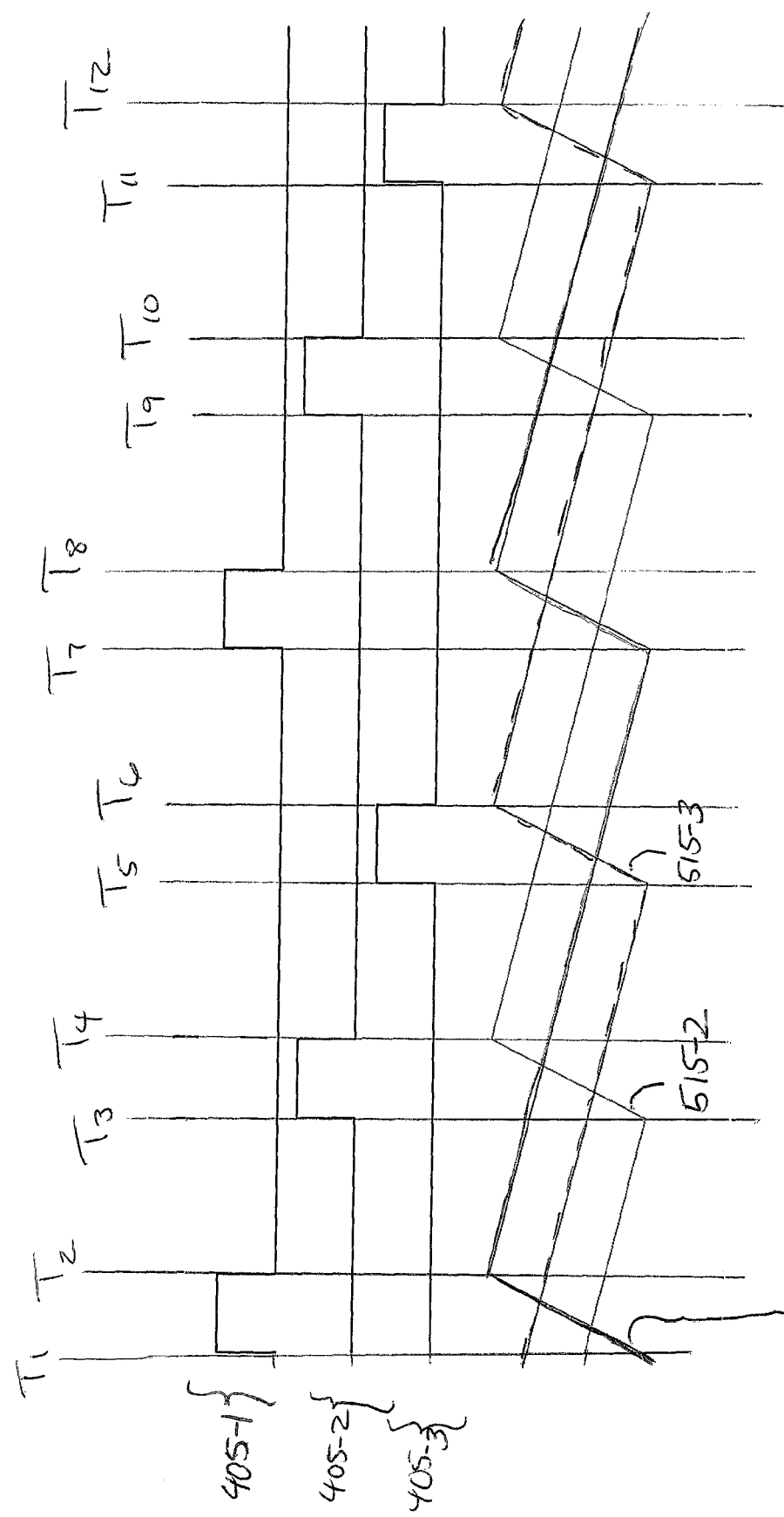
FIG. 6 is a timing diagram illustrating an example transient control mode in which a controller modifies an activation order of phases over time based on estimation of phase currents according to embodiments herein.

FIG. 6 is a timing diagram illustrating an example transient control mode in which a controller modifies an activation order of phases over time based on estimation of phase currents according to embodiments herein.

As previously discussed, in operational mode 120-2, the phase balance circuit 400-2 produces signals 515-1, 515-2, 515-3, etc., based on monitoring respective signal 405-1, 405-2, 405-3, etc. At or around time T1, to determine an activation order, the selection resource 560 compares the magnitudes of the respective estimated current values associated with phases 150 with respect to each other. For example, at time T1, the magnitude of signal 515-1 (estimated current associated with phase 1) is less than a magnitude of signal 515-2 (estimated current associated with phase 2); the magnitude of signal 515-2 is less than a magnitude of signal 515-3 (estimated current associated with phase 3). Accordingly, signal 515-1 is the lowest magnitude of estimated current amongst the enabled phases 150-1, 150-2, and 150-3.

Based on the comparing, the phase balance circuit 400-2 identifies a particular phase (i.e., phase 150-1) amongst the multiple phases that currently supplies a least amount of estimated current to the dynamic load 118 of the multiple phases 150. In this instance, the selection resource 560 initiates activation of phase 150-1. This includes turning on high side switch circuitry 142-1 (low side switch circuitry 146-1 is turned off) in phase 150-1. The control signal generator 420-1 activates high side switch circuitry 142-1 in phase 150-1 to an ON state until time T2 such as a predetermined time when the controller wants the high side switch circuitry set to an OFF state.

At or around time T3, the selection resource 560 compares the magnitudes of the respective current values associated with phases 150 with respect to each other. For example, at time T3, the magnitude of signal 515-2 is less than a magnitude of signal 515-3; the magnitude of signal 515-3 is less than a magnitude of signal 515-1. Accordingly, signal 515-2 is the lowest magnitude of the enabled phases 150-1, 150-2, and 150-3.

Based on the comparing, the phase balance circuit 400-2 identifies a particular phase (i.e., phase 150-2) amongst the multiple phases that currently supplies a least amount of current to the dynamic load 118 of the multiple phases 150. The selection resource 560 initiates activation of phase 150-2. This includes turning on high side switch circuitry 142-2 (low side switch circuitry 146-2 is turned off) in phase 150-2. The control signal generator 420-2 activates high side switch circuitry in phase 150-1 until predetermined time T4 as calculated by the controller.

As shown, the controller circuit 140 repeats the process to select the next phase to activate.

Figure 7:
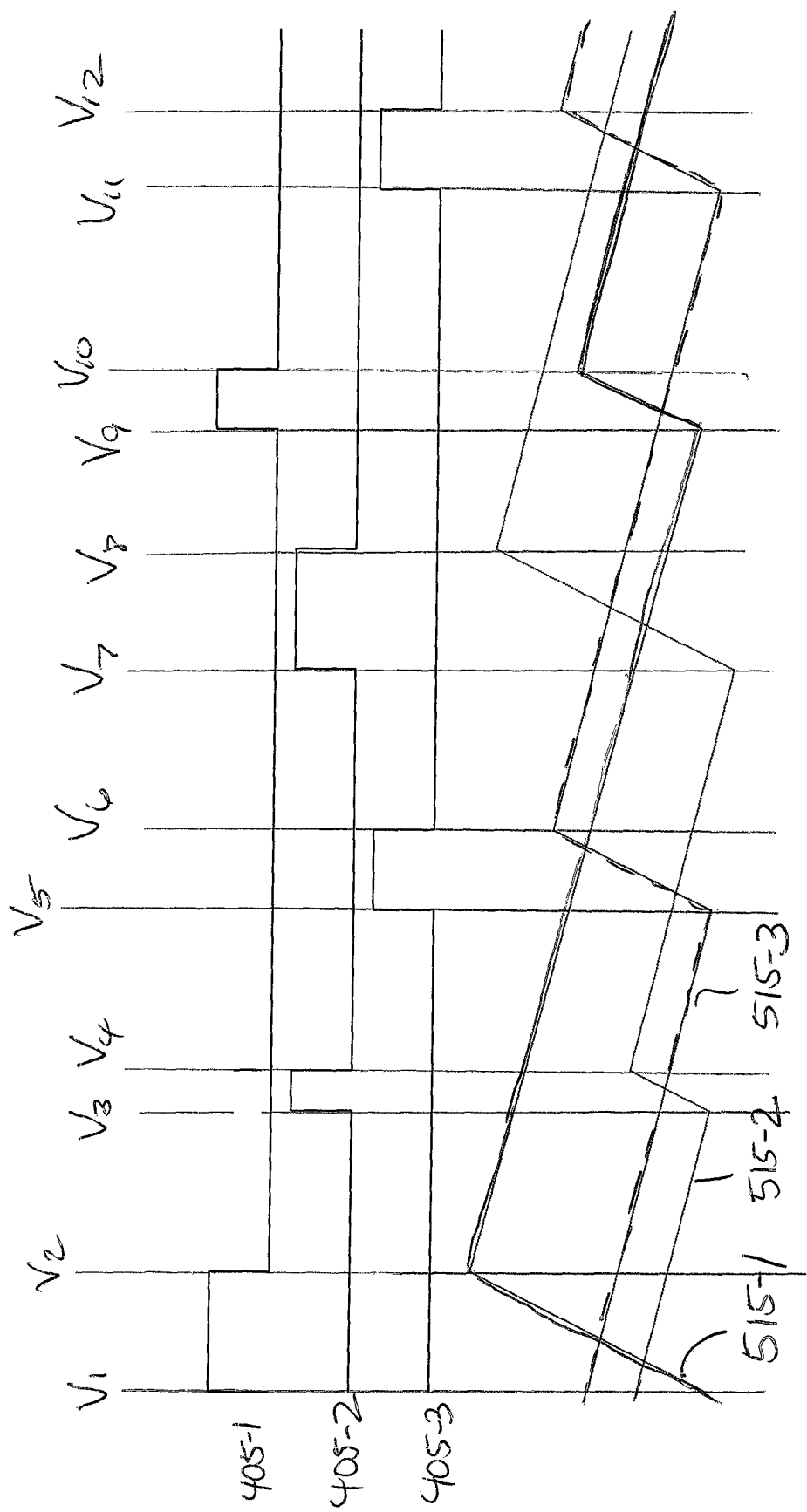
FIG. 7 is a timing diagram illustrating an example transient control mode in which a controller modifies an activation order of phases over time based on estimation of phase currents according to embodiments herein.

FIG. 7 is a timing diagram illustrating an example transient control mode in which a controller modifies an activation order of phases over time based on estimation of phase currents according to embodiments herein.

At time V1, the selection resource 560 compares the magnitudes of the respective current values associated with phases 150 with respect to each other. For example, at time V1, the magnitude of signal 515-1 is less than a magnitude of signal 515-2; the magnitude of signal 515-2 is less than a magnitude of signal 515-3. Accordingly, signal 515-1 is the lowest magnitude of the enabled phases 150-1, 150-2, and 150-3.

Based on the comparing, the phase balance circuit 400-2 identifies a particular phase (i.e., phase 150-1) amongst the multiple phases that currently supplies a least amount of current to the dynamic load 118 of the multiple phases 150. The selection resource 560 initiates activation of phase 150-1. For example, high side switch circuitry 142-1 is tuned ON; low side switch circuitry 146-1 is turned OFF at time V1. The control signal generator 420-1 activates high side switch circuitry 142-1 in phase 150-1 until time V2.

As shown, the controller circuit 140 repeats the process to select the next phase to activate.

As previously discussed, during an oscillatory condition in operational mode 120-2, the phases are activated out of order to accommodate the changing current consumption conditions of dynamic load 118.

For example, at time V7, the selection resource 560 compares the magnitudes of the respective current values associated with phases 150 with respect to each other. For example, at time V7, the magnitude of signal 515-2 is less than a magnitude of signal 515-1; the magnitude of signal 515-1 is less than a magnitude of signal 515-3. Accordingly, signal 515-2 is the lowest magnitude of the enabled phases 150-1, 150-2, and 150-3.

Based on the comparing, the phase balance circuit 400-2 identifies a particular phase (i.e., phase 150-2) amongst the multiple phases that currently supplies a least amount of current to the dynamic load 118 of the multiple phases 150. The selection resource 560 initiates activation of phase 150-2. This includes turning on high side switch circuitry 142-2 in phase 150-2 and turning OFF low side switch circuitry 146-2 at time V7. The control signal generator 420-2 activates high side switch circuitry in phase 150-2 until time V8.

At time V9, the selection resource 560 compares the magnitudes of the respective current values associated with phases 150 with respect to each other. For example, at time V9, the magnitude of signal 515-1 is less than a magnitude of signal 515-3; the magnitude of signal 515-3 is less than a magnitude of signal 515-2. Accordingly, signal 515-1 is the lowest magnitude of the enabled phases 150-1, 150-2, and 150-3.

Based on the comparing, at time V9, the phase balance circuit 400-2 identifies a particular phase (i.e., phase 150-1) amongst the multiple phases that currently supplies a least amount of current to the dynamic load 118 of the multiple phases 150. The selection resource 560 initiates activation of phase 150-1. This includes turning on high side switch circuitry 142-1 in phase 150-1 at time V9. The control signal generator 420-1 activates high side switch circuitry 142-1 in phase 150-1 until time V10.

At or around time V11, the selection resource 560 compares the magnitudes of the respective current values associated with phases 150 with respect to each other. For example, at time V11, the magnitude of signal 515-3 is less than a magnitude of signal 515-1; the magnitude of signal 515-1 is less than a magnitude of signal 515-2. Accordingly, signal 515-3 is the lowest magnitude of the enabled phases 150-1, 150-2, and 150-3.

Based on the comparing, the phase balance circuit 400-2 identifies a particular phase (i.e., phase 150-3) amongst the multiple phases that currently supplies a least amount of current to the dynamic load 118 of the multiple phases 150. The selection resource 560 initiates activation of phase 150-3. This includes turning on high side switch circuitry in phase 150-3 at time V11. The control signal generator 420-1 activates high side switch circuitry 142-3 in phase 150-3 until time V12.

Accordingly, phase balance circuit 400-2 modifies an ordering of activating phases in a sequence to accommodate an oscillatory or transient current consumption condition.

Figure 8:
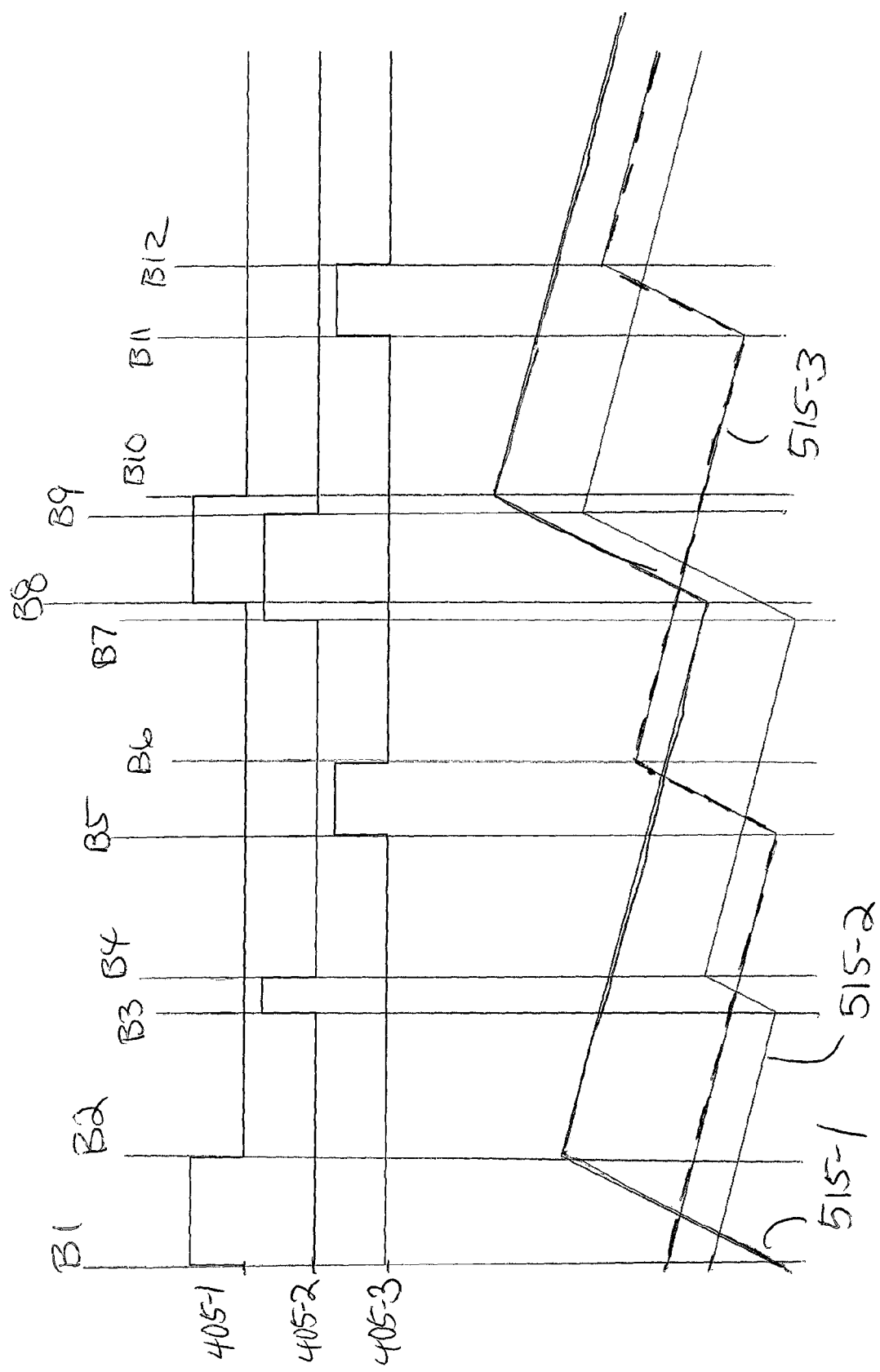
FIG. 8 is a timing diagram illustrating an example transient control mode in which a controller modifies an activation order of phases over time based on estimation of phase currents according to embodiments herein.

FIG. 8 is a timing diagram illustrating an example transient control mode in which a controller modifies an activation order of phases over time based on estimation of phase currents according to embodiments herein.

In this example embodiment, the phase balance circuit 400-2 operates in operational mode 120-2 in a manner as previously discussed. However, oscillatory current consumption conditions by dynamic load 118 can result in the need to provide extra current to the dynamic load 118.

As shown, at time B7, the phase balance circuit 400-2 monitors signals 515 and detects that current supplied by phase 150-2 is least amongst the multiple enabled phases. In such an instance, the control signal generator 420-2 of phase balance circuit 400-2 initiates activation of phase 150-2 (via activation of high side switch circuitry 142-2 an deactivation of low side switch circuitry 146-2).

While phase 150-2 is activated, at time B8, the phase balance circuit 400-2 attempts to activate another non-activated phase that provides a least amount of current to dynamic load 118 to accommodate current consumption by dynamic load 118. Amongst the multiple phases 150, the phase balance circuit 400-2 detects a currently activated phase (i.e., phase 150-2) in which a corresponding control switch (high side switch circuitry) is in an ON state.

At or around time B8, the currently activated phase 150-2 provides the least amount of estimated current to the dynamic load 118 amongst the multiple phases. However, the phase balance circuit 400-2 selects a currently non-activated phase (i.e., phase 150-1) that provides a next least amount of estimated current to the dynamic load 118. That is, the phase balance circuit 400-2 sets the corresponding control switch 142-1 in the selected phase (i.e., phase 150-1) to an ON state to activate the selected phase 150-1. Thus, in addition to modifying an activation order as discussed herein, multiple phases can be simultaneously activated to provide current to dynamic load 118.

Accordingly, the corresponding control switch circuitry 142-2 in the currently activated phase 150-2 is set to the ON state at the same time that the corresponding control switch circuitry 142-1 in the selected phase 150-1 is set to the ON state. As previously discussed, the corresponding control switch (high side switch circuitry 142-2) in the currently activated phase 150-2 can be set to the OFF state (at time B9). The corresponding control switch (high side switch circuitry 142-1) in the currently activated phase 150-1 can be set to the OFF state (at time B10).

Figure 9:
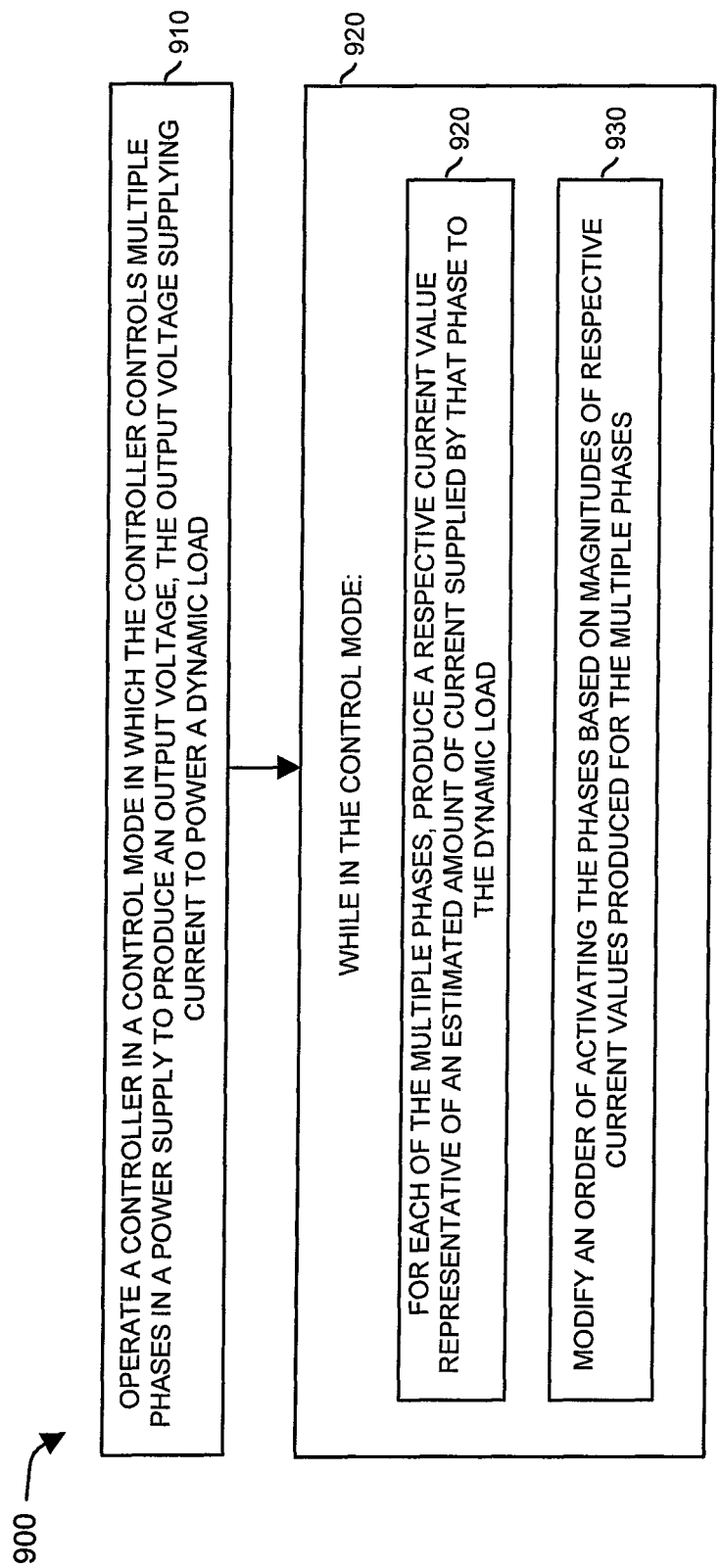
FIG. 9 is an example diagram illustrating a flowchart illustrating example methods according to embodiments herein.

FIG. 9 is a flowchart 900 illustrating an example method of controlling operation of a power supply 100 according to embodiments herein. Note that there will be some overlap with respect to concepts as discussed above. Also, the steps can be executed in any suitable order.

In processing block 910, the controller circuit 140 operates in a control mode (such as operational mode 120-2) in which the controller circuit 140 controls multiple phases 150 in the power supply 100 to produce an output voltage 180. The output voltage 180 supplies current to power dynamic load 118.

In processing block 920, while in the control mode, the controller circuit 140 produces, for each of the multiple phases 150, a respective current value representative of an estimated amount of current supplied by that phase to the dynamic load 118.

In processing block 930, while in the control mode, the controller circuit 140 modifies an order of activating the phases based on magnitudes of respective current values produced for the multiple phases 150.

Additional Embodiments

1. As mentioned, low speed phase balance in operational mode 120-1 can be achieved by adjusting the pulse widths of each phase by a per phase "pulse width adjust" value. This value captures the non-idealities on the board (like driver delay mismatches between phases). In one embodiment, the low speed phase balance algorithm is frozen or deactivated when the high-speed phase balance is operating. This ensures that the high-speed phase balance and low speed phase balance algorithms do not interact.

2. For each phase, the controller digitally creates synthetic current values (establishes values) based on input voltage, output voltage and the pulse train for that phase. We also high pass filter this current so that it is anchored to zero without drifting off (in either the +ve or −ve direction) and saturating.

3. The controller compares all the phase currents and figures out the phase with the minimum filtered synthetic phase current. The controller can be configured to make sure that an unused phase cannot be the minimum phase. Also, a phase which already has a pulse ON cannot be the minimum phase unless all used phases have a pulse on.

4. During load oscillation, the next phase to be turned on (or issued a pulse) does not follow the normal fixed sequence. The next phase would be the phase, which has the lowest filtered synthetic current (minimum phase). This ensures that phases that get large pulses are delayed and phases that get small pulses are advanced so as to equalize the currents in all phases.

Note again that techniques herein are well suited for use in power supply applications. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:
   operating a controller in multiple control modes in which the controller controls multiple phases in a power supply to produce an output voltage, the output voltage supplying current to power a dynamic load;
   a) while in a first control mode of the multiple control modes:
   repeatedly activating each of the multiple phases in accordance with a predetermined activation order;
   b) while in a second control mode of the multiple control modes:
   for each of the multiple phases, producing a respective current value representative of an estimated amount of current supplied by that phase to the dynamic load; and
   modifying an order of activating the phases based on magnitudes of respective current values produced for the multiple phases;
   while the controller is operated in the first control mode:
   switching from operating the controller in the first control mode to operating the controller in the second control mode in response to detecting a variation in magnitude of the output voltage, the method further comprising:
   switching from operating in the first control mode to operating the controller in the second control mode based at least in part in response to detecting that a frequency of a monitored AC voltage component of the output voltage is above a frequency threshold value.

2. The method as in claim 1 further comprising:
   in the first control mode: modifying a respective duty cycle of activating each of the multiple phases over time to substantially balance magnitudes of respective currents supplied by each of the multiple phases over time;
   wherein modifying the order of activating the phases in the second control mode substantially balances the magnitudes of respective currents supplied by the multiple phases over time.

3. The method as in claim 1 further comprising:
   in the second control mode:
   comparing the magnitudes of the respective current values with respect to each other;
   based on the comparing, identifying a particular phase amongst the multiple phases that supplies a lesser amount of current amongst the multiple phases to the dynamic load; and
   initiating activation of the particular phase as being next in a sequence of activating the multiple phases.

4. The method as in claim 1 further comprising:
   in the second control mode:
   monitoring a magnitude of an input voltage used by the multiple phases to produce the output voltage that produces the current powering the dynamic load;
   monitoring a magnitude of the output voltage; and
   utilizing the magnitude of the input voltage and the magnitude of the output voltage as a basis to produce the respective current value for each of the multiple phases.

5. The method as in claim 1 further comprising:
   in the second control mode:
   monitoring a magnitude of an input voltage used by the multiple phases to produce the output voltage that produces the current powering the dynamic load;
   monitoring a magnitude of the output voltage;
   receiving pulse width modulation control setting information associated with the control of the multiple phases; and
   applying the pulse width modulation control setting information to the magnitude of the input voltage and the magnitude of the output voltage to produce the respective current value for each of the multiple phases.

6. The method as in claim 1 further comprising:
   while operating the controller in the first control mode, monitoring AC (Alternating Current) attributes of the output voltage; and
   in response to detecting degradation of the AC attributes beyond a threshold value while in the first control mode, switching to operation of the controller in the second control mode.

7. The method as in claim 6, wherein operating the controller in the first control mode includes:
   for each of the multiple phases, producing a respective actual current value representative of an actual amount of current supplied by that phase to the dynamic load; and
   to balance current outputted from each of the multiple phases, adjusting pulse width modulation control settings of the phases based on magnitudes of the respective actual current values produced for the multiple phases.

8. The method as in claim 7, wherein adjusting the pulse width modulation control settings based on magnitudes of the respective actual current values in the first control mode includes:
   balancing current supplied by the multiple phases to be within a range of each other.

9. The method as in claim 1, wherein the respective current value for each of the multiple phases represents an estimated amount of AC current supplied by that phase to the dynamic load.

10. The method as in claim 1 further comprising:
    operating the controller in the first control mode in response to detecting a steady magnitude of consumption of current by the dynamic load; and
    operating the controller in the second control mode in response to detecting a transient change in consumption of the current by the dynamic load above a threshold value.

11. The method as in claim 1 further comprising:
    controlling the output voltage to be a target DC value while in the first control mode; and
    switching from operating the controller in the first control mode to operating the controller in the second control mode in response to detecting that a magnitude of an AC voltage component of the output voltage is above a voltage threshold value.

12. The method as in claim 1 further comprising:
while the controller operates in the second control mode:
amongst the multiple phases, detecting a currently activated phase in which a corresponding control switch is in an ON state, the currently activated phase providing the least amount of estimated current to the dynamic load amongst the multiple phases;
amongst the multiple phases, selecting a phase providing a next least amount of estimated current to the dynamic load, the selected phase having a corresponding control switch that is not in the ON state; and
setting the corresponding control switch in the selected phase to an ON state to activate the selected phase;
wherein the corresponding control switch in the currently activated phase is set to the ON state at the same time that the corresponding control switch in the selected phase is set to the ON state.

13. The method as in claim 1, wherein the respective current value for each of the multiple phases represents an estimated amount of AC current supplied by that phase to the dynamic load.

14. The method as in claim 1 further comprising:
while the controller is operated in the first control mode:
controlling the output voltage to be a target DC value while operating in the first control mode;
deriving an AC voltage component from the output voltage;
analyzing the AC voltage component; and
switching from operating the controller in the first control mode to operating the controller in the second control mode in response to detecting: i) that a magnitude of the AC voltage component of the output voltage is above a voltage threshold value, and ii) that a frequency of the AC voltage component of the output voltage is above a frequency threshold value.

15. The method as in claim 14, wherein deriving the AC component further comprises:
passing the output voltage through a high pass filter to derive the AC voltage component.

16. The method as in claim 15 further comprising:
in the first control mode: modifying a respective duty cycle of activating each of the multiple phases over time to substantially balance magnitudes of respective currents supplied by each of the multiple phases over time; and
wherein modifying the order of activating the phases in the second control mode substantially balances the magnitudes of respective currents supplied by the multiple phases over time.

17. The method as in claim 1 further comprising:
switching from operating in the first control mode to operating in the second control mode based at least in part in response to detecting that the magnitude of the output voltage is above a voltage threshold value.

18. A power supply system comprising:
multiple phases;
a controller operating in a control mode, the controller performing operations:
producing, for each of the multiple phases, a respective current value representative of an estimated amount of current supplied by that phase to the dynamic load; and
modifying an order of activating the phases based on magnitudes of respective current values produced for the multiple phases;
wherein the controller controls the output voltage to be a target DC value while operating in a first control mode, the power supply system further comprising:
a mode selection circuit operable to:
derive an AC voltage component from the output voltage;
analyze the AC voltage component; and
initiate switching from operating in the first control mode to operating the controller in a second control mode in response to detecting that a frequency of the AC voltage component of the output voltage is above a frequency threshold value.

19. The power supply system as in claim 18, wherein the controller further performs operations of:
comparing the magnitudes of the respective current values with respect to each other;
based on the comparing, identifying a particular phase amongst the multiple phases that supplies a least amount of current to the dynamic load; and
initiating activation of the particular phase as next in a sequence of activating the multiple phases.

20. The power supply system as in claim 18, wherein the controller further performs operations of:
monitoring a magnitude of an input voltage used by the multiple phases to produce the output voltage that produces the current powering the dynamic load;
monitoring a magnitude of the output voltage;
receiving pulse width modulation control setting information associated with the control of the multiple phases; and
applying the pulse width modulation control setting information to the magnitude of the input voltage and the magnitude of the output voltage to produce the respective current value for each of the multiple phases.

21. The power supply system as in claim 18, wherein the control mode is a second control mode; and
wherein the controller further performs operations of:
while operating the controller in a first control mode, monitoring AC (Alternating Current) attributes of the output voltage; and
in response to detecting degradation of the AC attributes beyond a threshold value while in the first control mode, switching to operation of the controller in the second control mode.

22. The power supply system as in claim 21, wherein operating the controller in the first control mode includes:
for each of the multiple phases, producing a respective actual current value representative of an actual amount of current supplied by that phase to the dynamic load; and
to balance current supplied by each of the multiple phases, adjusting pulse width modulation control settings of the phases based on magnitudes of the respective actual current values produced for the multiple phases.

23. The power supply system as in claim 18, wherein the mode selection circuit is further operable to:
initiate switching from operating in the first control mode to operating the controller in the second control mode in response to detecting: that a magnitude of the AC voltage component of the output voltage is above a voltage threshold value.

24. The power supply system as in claim 23, wherein the mode selection circuit includes a high pass filter that derives the AC voltage component from the output voltage.

* * * * *